(12) United States Patent
Augst (10) Patent No.: US 11,122,367 B2
(45) Date of Patent: Sep. 14, 2021

(54) METHOD, DEVICE, MOBILE USER APPARATUS AND COMPUTER PROGRAM FOR CONTROLLING AN AUDIO SYSTEM OF A VEHICLE

(71) Applicant: Bayerische Motoren Werke Aktiengesellschaft, Munich (DE)

(72) Inventor: Alexander Augst, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/591,133

(22) Filed: Oct. 2, 2019

(65) Prior Publication Data
US 2020/0037073 A1 Jan. 30, 2020

Related U.S. Application Data

(63) Continuation of application No. PCT/EP2018/064623, filed on Jun. 4, 2018.

(30) Foreign Application Priority Data

Aug. 1, 2017 (DE) ...................... 10 2017 213 241.8

(51) Int. Cl.
*H04R 3/04* (2006.01)
*G06F 3/01* (2006.01)
*G06F 3/16* (2006.01)
*G06F 17/18* (2006.01)
(Continued)

(52) U.S. Cl.
CPC ............... *H04R 3/04* (2013.01); *G06F 3/011* (2013.01); *G06F 3/017* (2013.01); *G06F 17/18* (2013.01);
(Continued)

(58) Field of Classification Search
CPC .......... H04B 1/082; H04B 1/202; H04R 5/02; H04R 2430/01; H04R 1/32; H04R 1/26;
(Continued)

(56) References Cited

U.S. PATENT DOCUMENTS

2002/0150254 A1 10/2002 Wilcock et al.
2006/0074651 A1* 4/2006 Arun ...................... G10L 15/22
704/233
(Continued)

FOREIGN PATENT DOCUMENTS

DE 10 2010 006 285 A1 8/2011
DE 102010006285 A1 * 8/2011 ............... H04R 5/04
(Continued)

OTHER PUBLICATIONS

International Search Report (PCT/ISA/210) issued in PCT Application No. PCT/EP2018/064623 dated Sep. 11, 2018 with English translation (four (4) pages).
(Continued)

*Primary Examiner* — Leshui Zhang
(74) *Attorney, Agent, or Firm* — Crowell & Moring LLP (57) ABSTRACT

In a method for controlling an audio system of a vehicle, an intention to communicate and/or a voice of at least one of a specific, occupant of the vehicle and/or of an occupant on a specific seat of the vehicle, are/is sensed, and at least one audio signal of the vehicle is changed as a function of the sensed intention to communicate and/or the voice of the occupant.

15 Claims, 2 Drawing Sheets

(51) Int. Cl.
*G10L 15/06* (2013.01)
*B60K 37/06* (2006.01)

(52) U.S. Cl.
CPC ...... *G10L 15/063* (2013.01); *G06F 2203/011* (2013.01); *H04R 2430/01* (2013.01); *H04R 2499/13* (2013.01)

(58) Field of Classification Search
CPC . H04R 1/403; H04R 3/00; H04R 3/04; H04R 3/12; H04R 3/14; H04R 2499/13; H04R 2430/00; H04R 2499/10; H03G 1/02; H03G 7/00; H03G 3/20; H03G 3/3005; H03G 3/3089; H03G 5/00; H03G 5/005; H03G 5/02; H03G 5/025; H03G 5/10; H03G 5/14; H04S 7/307; G06F 3/011; G06F 3/017; G06F 3/165; G06F 3/167; G06F 17/18; G06F 2203/011; G06F 3/00; G06F 3/16; G10L 15/063; B60K 37/06
USPC ............ 381/320, 316, 321, 97, 98, 99–108; 700/94
See application file for complete search history.

(56) References Cited

U.S. PATENT DOCUMENTS

| | | | |
|---|---|---|---|
| 2009/0055180 A1 | 2/2009 | Coon et al. | |
| 2015/0110287 A1 | 4/2015 | Holdren et al. | |
| 2015/0187354 A1* | 7/2015 | Kim | G10L 15/22 704/246 |
| 2017/0099380 A1* | 4/2017 | Lee | H03G 5/025 |
| 2018/0176684 A1* | 6/2018 | Cho | H04R 5/04 |
| 2019/0001992 A1 | 1/2019 | Kwoczek et al. | |
| 2020/0043470 A1* | 2/2020 | Nishikawa | G10L 15/065 |

FOREIGN PATENT DOCUMENTS

| | | | | |
|---|---|---|---|---|
| DE | 102012223320 A1 * | 6/2014 | | H03G 3/32 |
| DE | 10 2013 224 131 A1 | 5/2015 | | |
| DE | 10 2015 014 916 A1 | 5/2016 | | |
| DE | 10 2015 213 722 A1 | 1/2017 | | |
| DE | 10 2015 112 637 A1 | 2/2017 | | |
| JP | 07176178 A * | 7/1995 | | G11B 31/00 |
| JP | 2015071320 A * | 4/2015 | | |
| WO | WO 2014/030809 A1 | 2/2014 | | |

OTHER PUBLICATIONS

German-language Written Opinion (PCT/ISA/237) issued in PCT Application No. PCT/EP2018/064623 dated Sep. 11, 2018 (six (6) pages).

German-language Search Report issued in counterpart German Application No. 10 2017 213 241.8 dated Jun. 5, 2018 with partial English translation (14 pages).

* cited by examiner

METHOD, DEVICE, MOBILE USER APPARATUS AND COMPUTER PROGRAM FOR CONTROLLING AN AUDIO SYSTEM OF A VEHICLE

CROSS REFERENCE TO RELATED APPLICATIONS

This application is a continuation of PCT International Application No. PCT/EP2018/064623, filed Jun. 4, 2018, which claims priority under 35 U.S.C. § 119 from German Patent Application No. 10 2017 213 241.8, filed Aug. 1, 2017, the entire disclosures of which are herein expressly incorporated by reference.

BACKGROUND AND SUMMARY OF THE INVENTION

The invention concerns a method, a device, a mobile user apparatus and a corresponding computer program for controlling an audio system of a vehicle.

Modern vehicles can access a variety of different audio sources that can be played in the interior of the vehicle through an audio system of the vehicle. The audio sources include, for example, a radio receiver, music or audiobooks from a memory permanently installed in the vehicle (e.g., a hard drive) or from a terminal device carried in the vehicle. This includes accessing or playing streaming content, for example, an entertainment program from the Internet. Similarly, for example, sound for a video, a TV show, a video game or a video simulation can be output, for example, by means of a so-called rear-seat entertainment system. Audio systems for vehicles are also known that adjust the volume of a multimedia program as the vehicle speeds increase while travelling.

An artificially generated engine noise is also increasingly emitted via an audio system of the vehicle. Such engine noise can be part of a specific sound design. In the case of electric-powered vehicles, the artificially generated engine noise is used, for example, to create the familiar feeling of internal combustion engines for the driver.

In addition, there is typically a desire or necessity for the occupants of the vehicle to communicate with each other. Such communication, especially voice communication, can often be very relevant to the user of the vehicle. The ability of the occupants to communicate with each other in as undisturbed a manner as possible can sometimes be much more important for the users of the vehicle than the technical parameters of the vehicle, such as engine power, manufacturing quality, the vehicle design or the vehicle brand. However, communication between the occupants is very often disrupted by a large number of audio signals emitted in the vehicle. Therefore, there is a conflict between the occupants' desire to hear certain audio signals and to speak undisturbed during the journey. The occupants of the vehicle, for example, members of a family, can also have very different, sometimes contradictory, needs, for example, with regard to active voice communication or with regard to listening to other occupants or listening to certain audio signals.

An object underlying the invention is a method to demonstrate a device, a mobile user apparatus and a corresponding computer program to improve the control of an audio system of the vehicle.

In particular, at least one audio signal to be output is adjusted in such a way that a functional improvement or a functional augmentation results.

This object is achieved by the features of the independent claims. Advantageous embodiments are characterized in the subordinate claims.

According to a first aspect, the invention is characterized by a method for controlling an audio system of a vehicle. The method includes detecting an intention to communicate and/or a voice of at least one occupant, in particular a specific occupant of the vehicle and/or an occupant in a particular seat of the vehicle. The method also involves changing at least one audio signal of the vehicle depending on the communication intention and/or the voice of the occupant.

In a simplified example, in the method, when it is recognized that, for example, the passenger is starting to speak or is preparing to speak, the audio signal to be output, in particular the currently output audio signal, is changed appropriately. Preferably, the change is made only or primarily with regard to the appropriate time interval.

Thus, the audio signal is changed by means of the method in such a way that the (changed) audio signal and/or the occupant, at least the voice message of the occupant, can be better heard or understood.

The method can be set up to achieve certain objectives. Such objectives or the resulting benefits may include, in particular:

A speaker (driver, passenger, person in the back seat) does not have to drown out a running audio program in order to be sufficiently heard or understood.

A listener has to make less effort.

The speaker and the listener do not have to do without the audio program to have a conversation. The audio program can continue to be heard.

Urgent messages can also be reliably communicated even in the presence of very loud music.

The audio signal to be output can, for example, already exist as a stereo signal, preferably a multi-channel signal, or, for example, as an encoded spatial sound signal from an audio source, for example, as a data stream or corresponding data packets. The audio signal to be output can, for example, be present in one of the spatial sound formats known from home theater applications. Preferably, a spatial sound signal corresponding to the audio signal, for example, from the data or data packets of an audio source, can be determined, amplified and output in the interior of the vehicle according to the features of the invention described below.

In a simplified example, changing the audio signal can involve a change in a volume or a volume of one of several specific loudspeakers in the vehicle's audio system. Further variants are revealed in the further description.

The change, in particular adjusting the audio signal to be output, can already take place during its generation, for example, when determining the data sections representing the audio signal or the data stream. The change, in particular adjusting the audio signal to be output in the interior of the vehicle, can be carried out by means of the direct or indirect control of the vehicle's audio system or a computing unit carried in the vehicle, which generates, processes or outputs the audio signal.

For example, a change, in particular adjusting at least one parameter of the audio signal to be output in the interior, can be controlled by controlling an audio system carried in the interior of the vehicle depending on the detected communication intention or the voice of at least one occupant, especially a particular occupant of the vehicle and/or an occupant in a certain seat of the vehicle, wherein the control signals for controlling the audio system are produced, in particular at least partially, by means of an on-board computer of the vehicle or a mobile user apparatus carried in the vehicle.

The intention to communicate and/or the voice of at least one occupant, in particular a certain occupant of the vehicle may be detected, for example, with vehicle resources, for example, with microphones of a hands-free device and/or with further sensors in the interior of the vehicle, such as an interior camera. Particularly preferably, an intention to communicate can be captured with an interior camera of the vehicle and the appropriately configured image processing.

In one example, the intention to communicate represents that a voice communication, in particular by a particular occupant or by an occupant in a particular seat, in particular is to be expected with a certain measure of probability (above a threshold). With the intention to communicate, a predicted value of an acoustic parameter, for example, of the expected voice communication can also be captured and can be taken into account. The parameter "intention to communicate" can also characterize in an analogous way a conclusion or termination of a section of a voice communication, for example, an end of a sentence, a phrase, or a particular linguistic structure.

In particular, a parameter characterizing the beginning and/or end of the voice communication, the variation of the volume, pitch, etc. can be determined.

The audio signal of the vehicle may be the following in this invention:

A multimedia content, in particular played via a multimedia system of the vehicle, for example music, a video, a radio broadcast, a video game or a simulation, etc.

A part of a sound design of the vehicle and/or an artificially generated engine noise or driving noise, such as may be provided in electric vehicles, for example.

An announcement of an on-board computer of the vehicle or a user apparatus connected to the vehicle.

Furthermore, the audio signal of the vehicle can also be an audio signal of a mobile user apparatus (smartphone, tablet, smart watch, smart glasses) that is connected to the vehicle, in particular using the resources of the vehicle.

The vehicle's audio signal may also be a warning signal and/or a voice signal of a mobile user apparatus (smartphone, tablet, smart watch, smart glasses) that is connected to the vehicle and that is particularly related to the current driving context in which the vehicle is involved.

In particular, an audio signal may have an artificially generated, for example, synthesized, engine noise or an artificially generated driving noise. Such engine noise or artificially generated driving noise may be generated additionally or depending on the actual physical engine noise for the interior of the vehicle and (also) output with the vehicle's audio system. This may be combined, in particular mixed, in the vehicle's audio system with one or more other audio signals, in particular to be placed as one or more virtual sound sources (perceptible for an occupant in a certain position, distance, direction).

An artificially generated engine noise or driving noise may be used in the method depending on a real generated or output power of the drive of the vehicle and/or depending on a power called up by the driver from the vehicle drive (for example, before the corresponding power is actually available). In the method, a driving feeling with subjectively improved driving dynamics can be conveyed to the occupants, especially to the driver, wherein the driving feeling is desired by the driver. A corresponding output audio signal can be generated or controlled according to the invention in such a way that the transmission of a voice communication is not impaired or is only slightly impaired. This results in an essential creative freedom for the implementation of such engine noise or driving noise.

In this case, the mobile user apparatus can obtain information about the intention to communicate and/or the voice of at least one occupant, in particular a certain occupant of the vehicle and/or an occupant in a certain seat position in a vehicle, via an interface of the vehicle set up for this purpose (for example, from the microphones of the vehicle) and can accordingly make an adjustment to the audio signal of the vehicle that is caused thereby.

According to an optional design, it is also recognized that the recorded voice is a person's voice, in particular a voice of a particular person or group of people, and the change of the audio signal of the vehicle is dependent on recognition of the voice as a person's voice, in particular depending on the recognition of the voice of a particular person or group of people.

In other words, responses are especially made to person's voices, in particular not to other sources of noise, such as the barking of a dog or the horns of other road users or to background noise, for example, wind noise or specific soundscapes. Or rather, in principle according to the invention the response to other sound sources is different and/or with a different change to the audio signal, for example, also by adjusting parameters of the audio signal.

For example, an adjustment of an audio signal to be output, in particular speech or person's voices, is mainly or more strongly based on the parameter(s) of the voice communication than, for example, on acoustic parameters of another noise source, such as the barking of a dog or horns of other road users or on background noise, for example, wind noise or specific noise soundscapes.

For example, a parameter of the audio signal with which it is recognized that the audio signal includes speech is adjusted differently, in particular more strongly, compared to an audio signal that does not include speech or primarily contains music content.

This is particularly advantageous because a speech message is disturbed much more in terms of its comprehensibility by other voices than by other noises.

The voice of a particular person and/or the voice belonging to a particular group of people can be a learned voice. The learned voice is a voice that is in particular characterized by certain learned parameters or parameter combinations. Preferably, in the method the voices of certain people can also be learned, and a suitable adjustment of the audio signal can be carried out specifically following recognition of the voices of the people.

Learning the voice (of a particular person) or of the group of people can in turn take place in the vehicle or outside the vehicle or by means of another device, for example, a mobile user apparatus.

Learned voices can be represented and taken into account as one or more parameter values typical of the voice, for example, as corresponding data records. Based on such parameters, recognition data for one or more specific voices can be determined or processed in the method. For example, the recognition data for one or more voices can be obtained on the basis of a voice control, hands-free device of the vehicle or a mobile user apparatus (for example, when making a phone call).

Particularly preferably, for at least two voices of two different people a different adjustment (characteristic curve, mathematical context) of at least one section of the audio signal can be carried out.

In a further example, the at least one parameter of the audio signal can be adjusted differently, in particular much more strongly, for certain people highlighted by recognition or by a preset, or occupants on certain seats.

For example, if a person that is authorized to lead, for example, a manager or an operations manager, speaks to his or her employees or team when travelling, the method may be used to ensure sufficient silence or audibility of the spoken message. The "groups of people" include, for example, family members, known voices, especially learned in the vehicle, "women", "men" and "children".

In particular, a voice spoken in the interior of the vehicle (live) means the voice of a person (not a voice that is reproduced there, for example, from a radio broadcast).

According to a further optional design, the voice of a speaker in the interior of the vehicle is different from a voice from a multimedia player, in particular from the vehicle's sound system or from a device connected to the vehicle.

Preferably, the voice of a speaker in the interior of the vehicle can be distinguished from the voice from a multimedia system by comparing the signals of a microphone system of the vehicle and a signal of the multimedia system of the vehicle.

For example, the voice of a speaker in the interior of the vehicle may be distinguished from a voice from a multimedia recorder, in particular from the vehicle's sound system or a multimedia player connected to the vehicle, by determining whether the voice of a speaker in the vehicle is only contained or recognizable in the microphone system of the vehicle, or whether the voice can (also) be recognized in an evaluated signal of a multimedia system. Such a comparison can be carried out, for example, by evaluating a measure of similarity or a measure of correlation between a signal recorded with a microphone and an audio signal read in from the multimedia system, for example.

According to a further optional embodiment, the detection of the intention to communicate of at least one occupant of the vehicle is carried out by means of the recognition of his lip movement and/or a physical movement, in particular by means of an interior camera.

Preferably, a parameter of the audio signal can also be adjusted in advance (before or shortly after the start of speaking).

The advantage is that the person with a request for communication or intention to communicate, or who is about to communicate something by speech, is highly anticipated.

This can be implemented, for example, by means of an interior camera of the vehicle, which can at least capture the driver of the vehicle (and possibly the passenger) and can capture corresponding physical movements.

As an intention to communicate, one or more physical movements that precede speech can also be identified (from the analysis of body language and/or emotion analysis). This can be carried out based on relevant scientific-based laws or observations and/or based on user settings and/or preferably based on a machine learning method.

In particular, the learning of voices and/or physical movements in the method refers to certain characteristics, for example, corresponding qualitative and/or quantitative values or correlations between them.

Preferably, learning refers to the determination of a (scientific, mathematical) relationship between a parameter of one or more physical movements, which depend on certain patterns gestures of and/or facial expressions, and an associated or subsequent auditory communication, in particular the speech of a person (occupant). This can be carried out in the method with respect to a particular person or in relation to a person with certain characteristics, for example, characteristics recognizable by sensors (body size, clothing, movement parameters, group of people, etc.) or in relation to a person at a certain spatial position and/or in a seat of the vehicle.

According to the invention, the mentioned learning may also include: capturing a feedback indicator that is characteristic of an at least one-time expedient, appropriate or satisfactory adjustment of the audio signal, and then a consideration of the feedback indicator when the method is repeated.

Particularly preferably, it is provided that a smile and speaking and/or a face recognizably frightened by a strong facial gesture and loud speaking or shouting is detected as a condition for adjusting the audio signal, and then an adjustment of a parameter of the audio signal is made, in particular reinforced.

Particularly preferably, the audio signal of the vehicle can then be switched off, stopped, interrupted or adjusted more strongly when detecting a frightened face (facial expression) and/or when detecting an argument or shouting than for an average readiness to communicate and/or voice recognition.

According to a further optional design, the audio signal is adjusted depending on the position of the speaker and/or a relative direction from which the spoken content comes or will come according to the intention to communicate.

For example, the driver's speech or readiness to communicate and/or the speech of the occupant in the passenger seat may be matched differently by the (current or planned) audio signal of the vehicle, in particular more strongly than the speech and/or readiness to communicate of an occupant of the rear seat.

For example, occupants cannot change a traffic message from the rear seat or only in certain cases, while the occupant in the passenger seat has a stronger influence.

The position of the speaker can be determined according to the invention by a comparison between the signals of a microphone system in the vehicle (e.g., at least two microphones of a hands-free device) and/or seat occupancy detection and/or an interior camera.

For example, the position of the speaker can be determined from a phase shift of an acoustic signal, which is recorded, for example, by two spatially offset microphones in the vehicle.

According to a further optional design, an emotion detection and/or intent detection of an occupant of the vehicle is recognized and taken into account in the method, wherein the change of the audio signal then takes place, preferably in a different way.

In this case, the emotion detection and/or intent detection can be recognized in particular by resources of the vehicle, for example with an interior camera of the vehicle. For example, the emotion detection and/or intent detection may include an evaluation of the temporal variation of the facial expressions of the occupant or his gestures with or without further physical movements.

For example, if very high excitement of the occupant (speaker) is detected, an earlier and/or stronger adjustment of the audio signal of the vehicle may be carried out.

Furthermore, in the method alternatively or additionally switching from a first audio signal to a second audio signal, and if necessary vice versa, may be carried out depending on the detected parameter of the auditory communication. At least one section of the audio signal can be replaced by another section of the audio signal. This can be varied in the method by accessing the corresponding signal source or data sections.

Furthermore, on the determination, in particular prediction of an auditory communication parameter, a change of the spatial sound parameters of the audio system can take place such that changed acoustic spatial properties, in particular virtual acoustics, in particular adjusted for the parameter of the auditory communication, are simulated for the output of a section of the audio signal. For example, it may be in particular smooth switching or conversion between at least two parameter data sets representing different spatial properties, for example, a (certain) "concert hall", "jazz club", "science fiction", "cinema", "gaming", etc. "messages."

Depending on the detected parameter of the auditory communication (ultimately), a rapid switchover or a step-by-step transition between optimized music perception and optimized audibility of the auditory communication or to optimized perceptibility can be carried out.

Furthermore, in the method it is optionally provided that a repetition of a section of an audio signal takes place, which is or has been significantly influenced by the determined auditory communication. For example, a music track that has already started which has been drowned out significantly (strongly or during a relatively long time interval) while being played can be output repeatedly.

For example, a part of a program containing speech that has been significantly drowned out by auditory communication while being played (strongly or during a significant time interval) can be repeatedly output. The repetition can be carried out in such a way that the repeated section of the audio signal is a valid and sufficiently complete music section, in particular a meaningfully perceptible music section, for example, a vocal verse and/or an information section that is comprehensible in itself and/or a linguistic structure (phrase, sentence, subclause, etc.).

A repetition is also to be understood as that a new section of the audio signal or a section of the audio signal, at least insufficiently transmitted content, is regenerated, for example being thereby corrected, supplemented or replaced.

Also, determining a measure of the applicability and/or probability of success in relation to the output of at least one section of the audio signal to be output, taking into account the determined parameter of the auditory communication and/or at least one other acoustic content that is audible in the interior of the vehicle, for example, driving noise or engine noise, also in relation to predefined optimization criteria, may not be or may not have been sufficient, and subsequently: selection of a measure in relation to the audio signal to be output.

For example, a measure of an appropriate applicability of the adjustment of the audio signal and/or a measure of the probability of success can be made at least partially in advance, i.e., before or partially during the output of the audio signal. A measure of the probability of success can also be determined in relation to a section of the audio signal that is already in the output or the already output section of the audio signal. For example, a measure of applicability or probability of success may represent, in particular, an expected achievement of an optimization criterion, for example, with regard to the perceptibility of the relevant section of the auditory signal and/or the audio signal, from one or more specific seats of the vehicle.

Depending on the determined measure of the applicability and/or probability of success, various parameters of the audio signal described in this document can be adjusted, for example, the logic for adjusting the audio signal.

Such a measure may include, for example, varying the time of output of at least one section of the audio signal and/or a repeated output of a section of the audio signal.

Alternatively or additionally, at least one time parameter can be determined for the output of at least one section of the audio signal, which indicates an (absolute or relative) time, in particular at a start and/or an end or for the duration of a time interval, which is (explicitly) not suitable for the output of the audio signal, especially a particular section of the audio signal or an audio signal with a particular content, for example, taking into account at least one optimization criterion.

As a result, the output of at least one section of an audio signal can be carried out taking into account such a time parameter.

Preferably, the mentioned adjustment of the audio signal of the vehicle is carried out as the control of one or more parameters of the mentioned audio signal, wherein a setpoint of the control depends on a predetermined audibility and/or acoustic perceptibility of content represented with the audio signal and/or at least one section of the auditory communication is selected, in particular is continuously adjusted.

According to a further optional design, an applicability is additionally determined, in particular a probability of success, that the parameters of the audio signal were or are not sufficiently changeable for certain parameters and/or contents of the spoken language, in particular taking into account background noise. Subsequently, a selection is made of a measure or a combination of measures in relation to the audio signal of the vehicle, in particular for changing the audio signal of the vehicle and/or for a replay of at least one section of the audio signal. The parameters for further adjustment or re-adjustment of the audio signal can also be determined on this basis.

As a repetition it is also to be understood that a new section of the audio signal is generated or a section of the audio signal is regenerated, at least an insufficiently transmitted content, so that, for example, it is corrected, supplemented or replaced.

Also, determining a measure of the applicability and/or the probability of success in relation to the output of at least one section of the audio signal to be output may not be or may not have been sufficient, taking into account the determined parameter of the auditory communication and/or at least one other acoustic content that is audible in the interior of the vehicle, for example, a driving noise or engine noise, also with regard to predefined optimization criteria, and subsequently:

Selecting a measure in relation to the audio signal to be output.

For example, a measure of the appropriate applicability of the adjustment of the audio signal and/or a measure of the probability of success can be partially pre-determined, i.e., before or in part during the output of the audio signal. A measure of the probability of success can also be determined in relation to a section of the audio signal that is already in the output or has already been output. For example, a measure of applicability or probability of success may include, in particular, an expected achievement of an optimization criterion, with regard to the perceptibility of the relevant section of the auditory and/or the audio signal, for example, from one or more specific seats of the vehicle.

Depending on the determined measure for the applicability and/or probability of success, various parameters of the audio signal described in this document, for example, the logic for adjusting the audio signal, can be adjusted. Such a measure may include, as an example, varying the time of output of at least one section of the audio signal and/or a repeated output of a section of the audio signal.

Alternatively or additionally, at least one time parameter for the output of at least one section of the audio signal can indicate an (absolute or relative) time, in particular at a start and/or end or for the duration of a time interval, which is not suitable for the output of the audio signal, especially a particular section of the audio signal or an audio signal with a particular content, taking into account at least one optimization criterion (explicitly). As a result, the output of at least one section of an audio signal can be carried out taking into account such a time parameter.

According to a further optional embodiment, in addition a determination is carried out, in particular a prediction, of a parameter of an auditory communication in the interior of a vehicle and a change to at least one parameter of the audio signal of the vehicle is carried out depending on the determined, in particular predicted, parameter of the auditory communication.

Capturing an intention to communicate and/or a voice of at least one occupant, in particular, a certain occupant of the vehicle and/or an occupant in a specific seat of the vehicle, (or in particular predicting a further parameter of an auditory communication) can be carried out by resources of the vehicle, for example, microphones of a hands-free device, the hands-free device integrated into the vehicle or another sensor system in the interior of the vehicle, such as an interior camera.

The intention to communicate and/or a voice can contain values as a parameter or a sequence of several parameter, arranged in time, for example, with respect to the near past and/or approximately the present time and/or a prediction for the near future.

For example, a parameter of an intention to communicate and/or a voice can also represent a measure of the change of the values of a certain parameter value over time and/or in relation to a spatially related variable, for example, a direction or a distance.

At least one parameter representing the mentioned intention to communicate and/or voice may be determined in the method based on sensor data, a history, for example, in connection with one or more communications in the vehicle interior or communications with the participation of certain people and/or taking into account a probability calculation. For example, at least one parameter of the auditory communication can be predicted, in particular by means of a comparison or calculation of a large number of parameters from the history.

In particular, a parameter identifying the beginning and/or end of the voice communication, the variation of the volume, pitch, etc. can be determined.

The auditory communication can be a conversation in the interior of the vehicle (a monologue, a dialogue or a multi-directional conversation, effectively a "multilog," between multiple people in the vehicle).

In particular, at least one section of the mentioned auditory communication includes a spoken message, or certain sounds for communicating of an occupant in the interior of the vehicle. This can also be a monologue, wherein in particular at least one potential listener is in the vehicle.

Preferably, the method may include: recognizing that there are at least two occupants in the vehicle, in particular determining the number of occupants in the interior of the vehicle and taking into account the detected information in the method. For example, if human speech is detected and if there are at least two occupants in the interior of the vehicle, different changes to the parameter of an audio signal to be output in the interior may made compared to the case in which it is recognized that there is only one occupant (e.g., only the driver) in the interior.

The determined, in particular predicted parameter of the auditory communication is in particular an acoustic parameter, preferably:

a spatial sound parameter, for example, spatial distribution of the acoustic signal of the speech, a frequency parameter, for example, an energy density spectrum, a parameter characterizing the amplitude variation, or an amplitude change, or amplitude dynamics, or a so-called dynamic compression, a phase parameter, for example, a phase shift parameter.

Multiple parameters of the auditory communication can also be determined and/or predicted.

According to a further optional embodiment, the change of the parameter of the audio signal affects at least one spatial sound parameter, wherein preferably at least one direction from which the audio signal of the vehicle comes or is heard, in particular is heard by the driver of the vehicle, is adjusted.

Preferably, in the method the occupancy of one or more seats (e.g., by adult people, children, so-called children's seats and/or baby seats) is determined. Particularly preferably, the number and/or distribution of the occupants present in the vehicle in certain seats or seating positions within the vehicle interior is determined and taken into account in the method.

The determination of the number and/or distribution of people present in the vehicle may, in a simplified case, be determined by evaluating the actuation of corresponding door contacts, and/or detecting seat belt buckles, and/or by sensory, for example, capacitive, seat occupancy detection that is known to the person skilled in the art.

Furthermore, the determination of the number and/or distribution of people present in the vehicle may also be carried out by using the number of mobile user apparatuses located in the vehicle interior, in particular localized mobile user apparatuses, for example, mobile terminals and/or wearables (for example smart watches). Furthermore, the number and/or distribution of the people present in the vehicle can be carried out by means of so-called smart closes or by near field communication by means of NFC (=Near Field Communication) or for example RFID chips (=Radio Frequency Identification). It is not necessary to identify the personal identity of the occupants in the method. Nevertheless, such identification of certain people may also be carried out, in particular for assigning a specific user profile relevant to the method. For example, it can also be determined which of the people present is sitting in which of the seats of the vehicle, for example, in order to assign certain optimization criteria to the corresponding people or seats.

In particular, an association can be established between the people or the groups of people and certain seating positions or seats within the vehicle, for example, groups of people: an adult, a child, a baby without a baby seat, a baby seat with or without a baby. The method may also be applied differently to different groups of people (each as "speakers" and at least potential "listeners"). For example, in the method predetermined audio parameters, limit parameters, can be taken into account that should be exceeded and/or not exceeded in a certain seating area, for example, in the seating area of a child or a baby.

As a result, a change can be made to at least one audio signal to be output such that both a displacement of the acoustic power generated or to be generated in certain parts of the vehicle interior and/or a change in the phase of the audio output from one or more specific loudspeakers is carried out. In particular, a frequency-dependent change of a phase shift between the audio signal emitted by at least two loudspeakers of the vehicle can be carried out.

Optionally, changing the vehicle's audio signal affects one or more spatial sound parameters. In the method (with the change to one or more spatial sound parameters) one or more sound sources (also virtual, at least audible by human perception in the interior of the vehicle) can be generated.

For example, a sound source that is generated on the basis of the vehicle's audio signal depending on a spatial sound parameter that is determined in the method, represents, for example, a direction, distance, position and acoustic parameters of a sound source that are generated by means of the vehicle's audio system.

The generation of the sound sources in the method can relate in each case to a specific area of the interior from which the sound sources are made perceptible (audible). Preferably, a spatial sound parameter can also determine the (perceptible) direction, distance, position and acoustic parameters for at least one sound source that is to be made perceptible in a spatial area of the interior and/or in connection with a seat and/or a person belonging to a group of people or a specific person. For example, based on the audio signal to be output (and to be adjusted) and depending on the mentioned parameters of the auditory communication, auditory sound sources are generated for at least two different spatial areas of the interior of the vehicle or for two specific occupants, or occupants that are in certain seats, wherein each auditory sound source has different acoustic parameters, each of which is suitably adjusted, can be objectively measured or can be subjectively perceived by the actually present or assumed occupants.

Preferably, alternatively or additionally, a subjectively perceived direction generated by means of the spatial sound resources from which the audio signal comes can be displaced depending on the, in particular predicted, parameter of the auditory communication, for example, depending on an intention to communicate and/or a voice of at least one occupant of the vehicle. This can particularly preferably be carried out in combination with a change of the amplitude and/or frequency parameters of the audio signal.

Particularly preferably, the at least one spatial sound parameter (to be adjusted) represents one or more parameters for generating one or more sound sources (also virtual sound sources, audible at least by human perception). For example, a spatial sound parameter represents a direction, distance, position and acoustic parameters of one or more sound sources generated by the vehicle's audio system. The creation of the sound sources in the method can relate to a specific area of the interior from which these are made perceptible (particularly well or to an appropriate extent). Preferably, a spatial sound parameter can also determine the (perceptible) direction, distance, position and acoustic parameters for at least one sound source that is in a spatial area of the interior, and/or in connection with a seat and/or a person belonging to a group of people or a specific person. For example, based on the audio signal to be adjusted and depending on the mentioned parameters of the auditory communication, for at least two different spatial areas of the vehicle's interior or for two specific occupants, or occupants on specific seats, auditively perceptible sound sources are generated that have different acoustic parameters that are appropriately adjusted, objectively measurable or subjectively perceptible by the actually present or assumed occupants.

In addition, a spatial sound parameter can be adjusted in the method, depending on the determined distribution of the people on the seats of the vehicle and/or their positions, in such a way that a cumulative value for at least two people, representing the quality of perceptibility and/or the comprehensibility of at least one audio signal and/or at least one voice communication is increased or controlled towards a target value.

For example, only or predominantly a certain part of the audio signal that represents the speech (e.g., the voice of a protagonist) in a spatial sound system, for example, in a cinema format, can be changed, in particular spatially displaced for the perception of at least one occupant. In doing so, another part or channel of the audio signal, for example, representing background music to be output in the spatial sound system, can be adjusted less or in another way, depending on the determined, in particular predicted, parameters of the auditory communication.

In the method, optimization of the audibility of certain parts can be carried out, in particular of channels of a spatial sound or an audio signal containing the spatial sound.

In addition, in the method a measure of the relevance of certain sections of the vehicle's audio signal (to be output) for certain occupants, for example, belonging to certain groups of people, occupants in certain seats of the vehicle, can be determined and taken into account. For example, an adjustment of at least one section of the audio signal can be made in such a way that an age (baby, child, teen, adult, senior, etc.) and/or gender of an occupant is taken into account.

In addition, the specific characteristics of auditory perception, for example, from the psycho-acoustically known phenomena and differences, can also be determined and taken into account for a certain occupant, for example occupants belonging to a certain group of people.

In a simplified case, the interests and/or specific characteristics of the perception can be determined, in particular estimated, from a stored or determined user profile. For example, this can be in the form of deviations or differences compared to standardized values, for example.

It also allows the human brain to process the contents much better. The corresponding contents (which match the audio stimuli) can thus be "sorted" and processed very much better when perceived by a human being.

Preferably, it is also possible to distinguish how many people are communicating auditively (speaking), in particular which people are communicating with which people auditively, and depending on this one or more parameters of the audio signal can be adjusted appropriately in relation to the spatial sound or the spatial distribution of the audio signal.

For example, in the method, depending on at least one parameter of communication, the following may be the case:

A change, in particular an adjustment of the audio signal to be output may include a change of the frequency components of the audio signal that have an overlap with the frequency range of the human speech, in particular with the voice of the speaker, into frequency components with less coverage of the frequency range of the human voice, in particular the voice of the speaker.

For example, in the method, depending on at least one parameter of the communication, the following may be the case:

A change, in particular an adjustment, may be applied to the audio signal encoded in the frequency range or transformed into the frequency range, wherein the spectral properties may be adjusted, in particular a frequency density spectrum of at least part of the audio signal.

According to a further optional embodiment, the change to the parameter of the audio signal concerns a change to the audio signal in the frequency range, such that signal components of the audio signal that relate to the frequency range of the human speech, in particular within the speaker's voice, may be modified to distribute the signal energy to one or more frequency ranges that do not relate, or relate to a lesser extent, to the frequency range of the human voice, in particular the voice of the speaker.

In other words, a transformation of the frequencies of the audio signal can take place in such a way that the frequencies of the signal components of the audio signal, which contain a substantial part of their signal energy within the frequency range of human speech, in particular within the voice of the speaker, can be transformed into one or more frequency ranges that do not relate or relate to a lesser extent to the frequency range of the human speech.

For example, the method may include, depending on at least one parameter of the communication:

A change, in particular an adjustment, of the audio signal to be output may include a change of the frequency components of the audio signals that overlap with the frequency range of human speech, in particular the voice of the speaker, into frequency components that have a smaller overlap with the frequency range of the human voice, in particular the voice of the speaker.

For example, in the method, depending on the at least one parameter of the communication:

A change, in particular an adjustment to the audio signal encoded in the frequency range or transformed into the frequency range may be applied, wherein the spectral properties, in particular a frequency density spectrum of at least part of the audio signal, may be adjusted.

The modification, in particular the transformation of multiple signal components of the audio signal can be carried out in such a way that a mathematical relationship between the signal components, in particular one or more proportions, for example concerning the frequency density spectrum, remains essentially unchanged.

In particular, a frequency band transformation can also be applied, wherein the frequency components of the audio signal that lie within the frequency band of the human speech, in particular within the voice of the speaker, are transformed into the frequency ranges that lie essentially outside the frequency band mentioned above that is particularly important for human communication.

According to a further optional embodiment, the change to the parameter of the audio signal includes an at least partial shift of the frequencies of the audio signal, which correspond at least statistically to the frequencies of the speaker's voice signal, in particular with regard to a position and/or head orientation of at least one listener, from a first spatial direction in which the speaker is located into a second spatial direction that differs from the first spatial direction, in particular that is substantially opposite to the first direction.

An at least partial displacement is formed here, for example, in such a way that the audio signal from the direction of the speaker at least with a frequency range of for example from 120-6000 Hz, in particular from 350-3000 Hz, is reduced and frequencies of the audio signal from the audio system of the vehicle, which comes essentially from a direction other than the direction of the speaker, in a frequency range of 200-6000 Hz, in particular 350-3000 Hz, are amplified.

Particularly preferably, in this case a spatial shift of the audio signal with certain frequencies takes place in such a way that an overall frequency weighting of the audio signal arriving in total at the listener remains substantially unchanged or at least decrease substantially less than the reduction of the frequencies from the direction of the speaker.

Particularly preferably, different audio signals, in particular different sections or channels of a multi-channel audio signal, can be modified differently in the method, in particular adjusted. Each can be adjusted in specific way, for example to achieve a specific objective which is the aim of an optimization criterion.

Preferably, in the method, the audio signals (predominantly) representing speech, or sections or channels of an audio signal, for example radio broadcasts, can be adjusted differently, in particular more strongly, than the audio signals (predominantly) representing music, or sections or channels of an audio signal.

In doing so, the method can be a step towards evaluating an audio signal, for example coming from an audio source, wherein an indicator for the composition of the content of the audio signal, for example parts of speech, vocals, music background, scenic background noise, is determined and taken into account in the method.

According to a further optional design, the method also involves learning a particular voice and/or a certain physical movement of a speaker (speaking occupant) at one or more (earlier) time intervals. Then, when the particular voice is detected and/or a speaker's physical movement is detected at one or more later time intervals, an optimized or previously saved adjustment of the audio signal for the voice of the speaker is applied.

The following dependence preferably results:

If a physical movement, for example a certain lip movement pattern, is detected in a person who has always spoken quietly and/or indistinctly in the vehicle, the audio signal is adjusted comparatively strongly and to match the speaker's voice frequency.

If a physical movement, for example a certain lip movement pattern is detected, in a person who has always spoken loudly and/or clearly in the vehicle, then the audio signal is not adjusted or is adjusted comparatively weakly and suitably for the speech frequency of the speaker.

According to a further optional design, the method also involves learning a certain physical movement that precedes speaking, in particular in the case of a particular occupant, of a voice communication in one or more time intervals. In the event of recognition of the physical movement, in particular also when recognizing the particular speaker and/or the physical movement typical of the speaker from several time intervals, the method involves applying an optimized or previously stored adjustment of the audio signal for the speaker's voice.

Particularly preferably, a physical motion preceding a certain vocal range or voice tone can be detected, and then a (much more precise) adjustment of the audio signal can be made.

In the method, a plurality of learned voices in the form of one or more parameter values typical of the voice can be taken into account. On the basis of such parameters, recognition data for the voices of the occupants can be determined or processed in the method. For example, the recognition data for one or more voices of the occupants can be obtained (even in advance) based on a voice control, a hands-free device of the vehicle or a mobile user apparatus (for example when making a phone call).

Physical motions of the occupants can also be learned and/or taken into account in the method (in a comparable way).

In particular, learning voices and/or physical movements refers to certain characteristics of certain occupants, for example corresponding qualitative and/or quantitative values, in particular of occupants belonging to certain groups of people or connections between them.

Preferably, learning refers to the determination of a (scientific, mathematical) relationship between a parameter of one or more physical movements that depend on certain patterns of gestures and/or facial expressions, and an associated or subsequent auditory communication, in particular speaking by a person (occupant). In the method, this can be learnt with respect to a particular person or in relation to a person with certain characteristics, for example recognizable by sensors (body size, clothing, movement parameters, group of people, etc.) or in relation to a person at a certain spatial position and/or in a seat of the vehicle.

According to the invention, the mentioned learning may also include: capturing a feedback indicator that is characteristic of an at least one-time advantageous, appropriate or satisfactory adjustment of the audio signal, and then taking the feedback indicator into account when the method is repeated.

Preferably, the mentioned change of the audio signal of the vehicle is carried out as a control of one or more parameters of the mentioned audio signal, wherein a setpoint of the control depends on a predetermined audibility and/or acoustic perceptibility of content represented by the audio signal and/or at least one section of auditory communication is selected, in particular is continuously adjusted.

According to a second aspect, the invention is characterized by a device for controlling an audio system of a vehicle, wherein the device is designed to perform the method. The device according to the invention has the same advantages as were described above in connection with the method of the invention.

In an appropriate embodiment, the device comprises further resources for carrying out the method.

According to a third aspect, the invention is characterized by a mobile user apparatus that comprises an interface with the vehicle and that is set up to perform at least part of the method.

According to a fourth aspect, the invention is characterized by a computer program, in particular a computer program product comprising the computer program, wherein the computer program is embodied, when executed on a computing unit, to carry out a substantial part of the method according to the invention or to carry out an advantageous embodiment of the method according to one or more other features of the method. In particular, the computer program is a computer program that, for example, acts as an app ("application") capable of running on a device installed in or carried in the vehicle.

The computer program or computer program product comprises an executable program code, which, when executed by a device comprising a computing unit, carries out at least part of the method according to an aspect described in the present case or an advantageous embodiment of the method described in the present case. The computer program product may be embodied as an update of a previous computer program, which, for example, contains the parts of the computer program or the corresponding program code for a device of the vehicle as part of a functional extension, for example in the context of a so-called "remote software update".

In the context of this description, the vehicle is preferably a motor vehicle, in particular a passenger car. This is advantageous because the interior of such a vehicle forms a comparatively limited, acoustically largely isolated or closed space in which multiple auditory communications and one or more audio signals are to be created and heard within a confined space. In principle, however, the method can also be applied to other types of vehicles, for example a bus, a train, watercraft, aircraft, if necessary in a suitably adjusted form.

Exemplary embodiments of the invention are explained in more detail below, without limitation of the general applicability thereof, based on the schematic drawing. In the FIGURE:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 2:
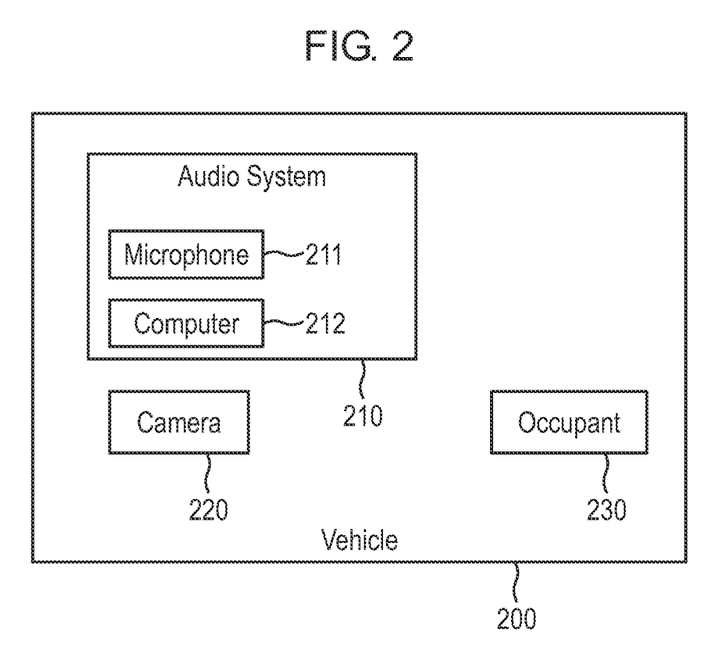
FIG. 2 shows a schematic block diagram of a vehicle with an audio system according to the present invention.

As shown in the schematic block diagram of FIG. 2, the vehicle 200 includes an audio system 210, an interior camera 220, and one or more occupants 230. The audio system 210 includes at least one microphone 211 and a computer 212. The operation of these elements is further described below.

Figure 1:
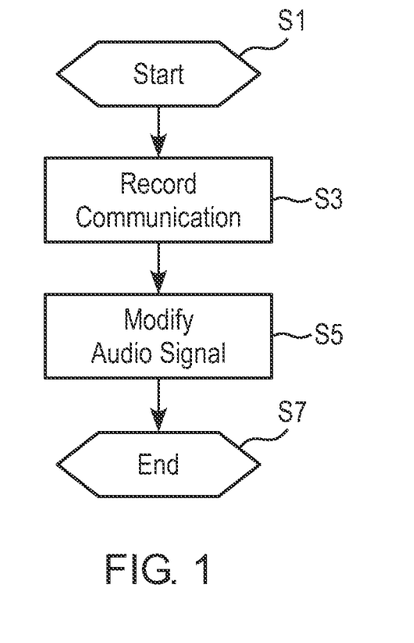
FIG. 1 shows a flowchart of the control of an audio system of a vehicle.

FIG. 1 shows a flowchart for controlling a vehicle's audio system.

The program can be processed by one device or distributed for processing by several devices. The device includes for this in particular a computing unit, a program and data memory as well as, for example, one or more communication interfaces.

The program is started in a step S1, in which variables can be initialized if necessary.

In a step S3, an intention to communicate and/or a voice shall be recorded of at least one occupant, especially of a particular occupant of the vehicle and/or of an occupant in a specific seat of the vehicle.

In a step S5, at least one audio signal of the vehicle is modified depending on the intention to communicate and/or the voice of the occupant.

In this example, the modification includes an adjustment of the audio signal, in particular of individual channels of a spatial sound signal, proportions between individual channels, and a specification for processing (e.g., mixing) of individual channels of the audio signal, also depending on certain optimization criteria.

The optimization criteria can be (in relation to the method), for example, a lowest possible sound level overall in the interior, in particular at certain seating positions, better subjective perceptibility and/or comprehensibility of the communication and/or the content of the audio signal.

These can be changed with the user settings, for example.

For example, depending on the detected intention to communicate and/or the voice of at least one occupant, especially a particular occupant of the vehicle and/or an occupant at a specific seat of the vehicle, an adjustment is carried out of one or more parameters that is or are characteristic of the spatial division of one or more audio signals to be output, in particular audio signals with different contents and/or from different audio sources and/or several channels of a spatial sound signal, within the interior of the vehicle.

Applying sound with certain audio signals, of which there may be not only one but even several, can also be adjusted by selecting the loudspeakers or optimizing the balance between certain loudspeakers ("left", "right", "center", "front", "rear") in the interior of the vehicle. Furthermore, alternatively or additionally phase parameters of at least one signal component of an audio signal can be adjusted in such a way that a subjective impression is created for an occupant that the sound source corresponding to a (certain) part or portion of an audio content comes from a certain direction and/or is located at and/or moved to a certain distance from the occupant.

The parameter of the at least one or two of the audio signals to be output can be adjusted in such a way that an (optimized) distribution of the two different audio contents represented therein results within the interior of the vehicle. In particular, a distribution or mapping of the parts of the audio content (possibly provided in a spatial sound signal of the audio source) is altered to specific spatial areas and/or directions.

Furthermore, the properties of propagation, damping and reflection of acoustic waves, in particular from several frequency ranges in the interior of the vehicle, can also be taken into account in the method. The corresponding parameters, for example a data set representing an acoustic model of the vehicle interior, can be read in and taken into account in the method.

Furthermore, in the method, an association between the (pre-set, determined, or estimated) interests of the occupants, for example certain people, occupants belonging to certain groups of people on the one hand and the types and/or contents of the audio signal on the other hand may be taken into account.

A measure of the relevance of certain sections of the audio signal for certain occupants, for example occupants belonging to certain groups of people or occupants in certain seats of the vehicle, can also be determined and taken into account. For example, an adjustment of at least one section of the audio signal can be made in such a way that an age (baby, child, teen, adult, senior, etc.) and/or gender of an occupant is taken into account. In doing so, for a particular occupant, for example an occupant belonging to a certain group, specific characteristics of auditory perception, for example phenomena or differences known from psychoacoustics, may be determined and taken into account. In a simplified case, the interests and/or specific characteristics of perception can be determined, in particular estimated, from a stored or determined user profile. This can, for example, be in the form of deviations or differences, for example compared to standardized values.

In an alternative or additional variant of the invention, it is provided that, depending on the recognized subject, intonation and direction of the communication and the specific occupants participating in the communication, a decision is made to issue one of two or several different audio signals, for example from different audio signal sources and/or with different content. For example, switching between at least two different audio signals can be performed, in particular with significantly different content, topics, shutdowns or from different audio sources.

For example, when spouses or partners are talking about a relationship topic, a topic concerning children, a typical contentious topic, and the corresponding (typical, objectively comprehensible) characteristics or parameters of this topic can be identified, a section of the audio signal with suitable content, for example, a quieter music track or program (or a section of the audio signal that can produce a desired psychological effect) is output, in particular instead of previously issued or planned content, for example rather noisy content.

Optionally, in the method a physical movement (more or less conscious for the person himself or intuitively executed or reflexively executed), with the intention of listening in a certain direction, for example, containing turning the head or a hand on the right ear or on the left ear, can be determined and processed in the method. In one example, a parameter, in particular representing the signal volume of the audio signal to be output from the respective direction or the content from a particular direction, can be changed, in this example can be increased, and/or a section of the audio signal can be repeated, for example, the last sentence or phrase.

For example, a redistribution of the output audio content can take place between at least two spatial areas of the vehicle, for example, by applying sound with a specific audio content to the front left area with increased volume and/or with a changed frequency characteristics relative to the rear right area. Thus, the distribution can be carried out between the front and rear seats, between the driver's seat and the other seats or between the right and left half of the interior. This can, for example, improve the auditory communication of an occupant occupying the passenger seat and addressing occupants in the rear seat by, for example, significantly reducing and/or outputting with changed parameters the output of engine noise or driving noise in the area of the rear seats by means of the rear speakers. On the other hand, the engine noise or driving noise emitted by the loudspeakers facing the driver's seat can be maintained.

For example, the so-called, especially sound sources for at least two audio signals that correspond to different audio content and/or signal sources can be controlled, in particular regulated, depending on the at least one determined position of a speaker (for example the occupant that is currently communicating auditively).

For example, an assignment of one or more channels of a spatial sound signal to certain physical speakers and/or virtual sound sources can be adjusted depending on the head position and/or head direction and/or viewing direction of the occupant.

In an alternative or additional variant of the invention, it is provided that, depending on the recognized subject, intonation and direction of communication, the certain occupants participating in the communication, a decision is made to output one of two or multiple different audio signals, for example from different audio signal sources and/or with different content. For example, switching between at least two different audio signals can be performed, in particular with significantly different content, topics, shutdowns or from different audio sources. For example, if spouses or partners are speaking about a relationship topic, a topic concerning children, a typical contentious topic, and the corresponding (typical, objectively comprehensible) characteristics or parameters of the mentioned topic are recognized, a section of the audio signal with matching content, for example a quieter music track or program (or a section of the audio signal that can produce a desired psychological effect) is output, in particular instead of previously issued or planned content, for example rather noisy content.

Optionally, in the method a physical movement (more or less conscious for the person himself or intuitively executed or reflexively executed) with the intention of listening in a certain direction, for example including turning the head or a hand on the right ear or on the left ear, is determined and processed in the method. In one example, the signal volume of the audio signal or the content to be output heard from a particular direction can be increased, or a section of the audio signal, for example the last sentence or phrase, can be repeated.

In particular, a temporal variation in the spatial distribution of the audio content (an adaptive spatial distribution that changes over time) can be performed. The variation of the spatial distribution of the audio content can be carried out depending on a recognized change, in particular a prediction of a change, of at least one parameter of the auditory communication.

In particular, in the method a subjectively perceived direction and/or distance and/or a subjectively perceived place in which a certain content represented by the audio signal is perceived (belongs) by the human (binaural) acoustic perception is adjusted. For example, the sound sources corresponding to the specific contents of the audio signal can be varied in terms of their perceived position and/or direction and/or distance.

In the method, one or more phase parameters, in particular a phase offset of at least one signal component of the parts of the audio signal or two audio signals that are output or are to be output by at least two different loudspeakers in the interior can be adjusted appropriately.

In particular, the control, preferably the regulation of a parameter of one or more audio signals or channels of a spatial sound signal to be output, can be carried out depending on the intention to communicate and/or the voice of at least one occupant, in particular a particular occupant of the vehicle and/or an occupant in a specific seat of the vehicle. The parameters of the audio signal can also be adjusted in such a way that a so-called enveloping value and/or an integrated value and/or a low-pass filtered value of at least one parameter results within predetermined limits.

For example, depending on which seat the occupant of the vehicle is seated in within the vehicle, and/or in which direction the first occupant is communicating, the audio signal to be output in the interior of the vehicle may be adjusted differently, in particular more strongly, than for the speech of another second occupant in the interior of the vehicle that is located in a different seat within the interior.

In a step S7, the program is terminated and can be started again in step S1 if necessary.

The method can optionally include one or more of the following steps:

A step in which it is also recognized that the voice recorded is a person's voice, in particular a voice of a particular person or group of people, and that the change of the audio signal of the vehicle depends on the recognition of the voice as a person's voice, in particular depending on the recognition of the voice of a particular person or group of people.

A step in which the voice of a speaker in the interior of the vehicle is distinguished from a voice from a multimedia recorder, in particular from the sound system of the vehicle or a multimedia recorder connected to the vehicle.

A step in which the detection of the intention to communicate of at least one occupant of the vehicle by recognizing his lip movement and/or a physical movement, in particular by means of an interior camera.

A step in which the audio signal is adjusted depending on the position of the speaker and/or a relative direction from which the spoken content comes or will come according to the intention to communicate.

A step in which an emotion recognition and/or intent detection of an occupant of the vehicle is detected and is taken into account in the method, wherein the change of the audio signal is carried out, preferably in different ways.

A step including determining an applicability, in particular a probability of success, that the parameters or contents of the spoken speech and the parameters of the audio signal cannot be modified sufficiently, in particular with regard to the background noise, and then a step including the selection of a measure or a combination of measures in relation to the audio signal of the vehicle, in particular to change the audio signal of the vehicle.

A step including determining, in particular predicting, a parameter of an auditory communication in the interior of a vehicle, and a step including changing at least one parameter of the audio signal of the vehicle depending on the determined, particularly predicted, parameter of the auditory communication.

In this example of the method, the voice of a person (a speaker) in the interior of the vehicle is distinguished from content containing a human voice that is output in the vehicle, for example from the mentioned audio system of the vehicle or from another audio output device, in particular another mobile user apparatus. Such a distinction can be made in the method depending on a comparison of a signal of the audio system with the signal of a microphone.

The mentioned parameter of the auditory communication can be for example a temporally ordered sequence of multiple parameter values, for example in relation to the near past and/or approximately the current time, and/or a prediction for the near future. For example, a parameter of the auditory communication can also represent a measure of the change in the values of a given parameter value over time and/or in relation to a variable related to space (spatial dimension, distance unit, position value, etc.), for example a direction or distance.

At least one parameter of the auditory communication can be determined in the method on the basis of sensor data, a history, for example in connection with one or more communications in the vehicle interior or communications with the participation of certain people and/or under consideration of a probability calculation. For example, at least one parameter of the auditory communication can be predicted, in particular by means of a comparison or calculation of a large number of parameters from the history.

In addition, a recognition of keywords or certain communication sounds (exclamations, interjections, tongue clicking, shouting, laughter, sobbing, crying, etc.) can be taken into account. In particular, at least one parameter of the audio signal to be output in the interior can be adjusted, in particular predictively, depending on the detected gesture and a recognized keyword. Preferably, a degree of agreement between at least one recognized gesture and at least one keyword or communication sound can be determined and taken into account in the method.

A step in which the change of the parameter of the audio signal concerns at least one spatial sound parameter, wherein preferably at least one direction from which the audio signal of the vehicle comes or is heard, in particular heard by the driver of the vehicle, is adjusted.

A step in which the change of the parameter of the audio signal involves a variation of the audio signal in the frequency range in such a way that signal components of the audio signal that relate to the frequency range of the human speech, in particular within the voice of the speaker, are modified such that the signal energy is distributed to one or more frequency ranges that do not relate, or only relate to a lesser extent, to the frequency range of the human voice, in particular the voice of the speaker.

A step in which the change of the parameter of the audio signal involves at least partial displacement of the frequencies of the audio signal, which correspond at least statistically to the frequencies of the speaker's voice signal, from a first spatial direction in which the speaker is located to a second spatial direction that is arranged differently from the first spatial direction, in particular substantially opposite to the first direction.

A step containing learning a particular voice and/or a specific physical motion of a speaker at one or more time intervals, and then a step including the application of an optimized or previously saved adjustment of the audio signal for the voice of the speaker in the event of the recognition of the particular voice and/or the particular physical activity of a speaker at one or more later time intervals.

Learned voices can be represented as one or more parameter values typical of the voice. On the basis of such parameters, recognition data for one or more specific voices can be determined or processed in the method. For example, the recognition data for one or more voices can also be obtained on the basis of the data of a voice control, a hands-free device of the vehicle, or a mobile user apparatus (for example when making a phone call).

A step including learning a certain physical movement that precedes speaking, especially of a particular occupant, of a voice communication at one or more time intervals, and then a step including the application of an optimized or previously stored adjustment of the audio signal for the speaker's voice on recognizing a physical movement, in particular when recognizing the particular speaker and/or the physical movement typical of the speaker from several time intervals.

In particular, learning voices and/or physical movements relates to certain characteristic features, for example corresponding qualitative and/or quantitative values, for certain occupants, in particular occupants belonging to certain groups of people or connections between them.

Preferably, learning refers to the determination of a (scientific, mathematical) relationship between a parameter of one or more physical movements that depends on certain patterns of gestures and/or facial expressions and an accompanying or subsequent auditory communication, in particular speaking by a person (occupant). This can be learned in the method with respect to a particular person or in relation to a person with certain characteristics, for example recognizable by sensors (body size, clothing, movement parameters, group of people, etc.) or in relation to a person at a certain spatial position and/or in a seat of the vehicle.

According to the invention, the mentioned learning may also include: capturing a feedback indicator that is characteristic of an at least one-time expedient, appropriate or satisfactory adjustment of the audio signal, and then taking the feedback indicator into account when the method is repeated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling an audio system of a vehicle including a microphone and a computer, the method comprising:
    capturing with the microphone a voice of an occupant of the vehicle;
    determining, by the computer, in which seat of the vehicle the occupant is sitting based on the voice captured by the microphone;
    changing an audio signal of the vehicle depending on the voice and the seat in which the occupant is sitting;
    predicting a parameter of an auditory communication in an interior of the vehicle; and
    changing a parameter of the audio signal of the vehicle depending on the predicted parameter of the auditory communication;
    wherein the changing of the parameter of the audio signal concerns at least one spatial sound parameter, wherein at least one direction from which the audio signal of the vehicle comes or is heard by a driver of the vehicle is adjusted;
    wherein the changing of the parameter of the audio signal includes modifying the audio signal in a frequency range in such a way that signal components of the audio signal relating to the frequency range of human speech within the voice of the occupant are modified in such a way that signal energy is distributed to multiple frequency ranges that do not relate or that relate to a lesser extent to the frequency range of the voice of the occupant; and
    wherein the changing of the parameter of the audio signal includes at least partial displacement of frequencies of the audio signal that correspond at least statistically to frequencies of the voice of the occupant, from a first spatial direction in which the occupant is located to a second spatial direction, which is arranged differently from the first spatial direction, essentially opposite to the first direction.

2. The method according to claim 1, further comprising recognizing that the voice is the voice of a particular person or group of people, and recognizing that a change to the audio signal depends on a recognition of the voice as the voice of the particular person or group of people.

3. The method according to claim 2, wherein the voice of the occupant in an interior of the vehicle is distinguished from a voice from a multimedia recorder of the audio system or a multimedia recorder connected to and carried along with the vehicle.

4. The method according to claim 1, wherein the voice of the occupant in an interior of the vehicle is distinguished from a voice from a multimedia recorder of the audio system or a multimedia recorder connected to and carried along with the vehicle.

5. The method according to claim 1, further comprising detecting an intention to communicate of at least one occupant of the vehicle, by an interior camera, at least one of a lip movement and a physical motion.

6. The method according to claim 5, wherein
    the audio signal is adjusted depending on a position of the occupant and/or a relative direction from which spoken content comes or will come according to the intention to communicate.

7. The method according to claim 5, wherein
at least one of an emotion detection and an intent detection for the occupant of the vehicle is recognized and is taken into account when a change of the audio signal is carried out.

8. The method according to claim 1, further comprising:
determining a probability of success that parameters of the audio signal are or were not able to be changed for certain parameters and/or spoken contents based on background noise,
subsequently selecting a measure or combination of measures in relation to a change in the audio signal of the vehicle and/or a replay of at least one section of the audio signal.

9. The method according to claim 1, further comprising:
learning the voice and/or a specific physical motion of the occupant of the vehicle at one or more time intervals;
subsequently, in a case of further recognition of the particular voice and/or the specific physical motion of the occupant at one or more later time intervals, applying an optimized or previously saved adjustment of the audio signal for the voice.

10. The method according to claim 1, further comprising:
learning a physical motion that precedes speaking a voice communication at one or more time intervals of a particular occupant,
subsequently, in a case of a repeat recognition of the physical motion of the particular occupant and/or a physical motion typical of the occupant from several time intervals, applying an optimized or previously saved adjustment of the audio signal for the voice of the occupant.

11. The method according to claim 1, wherein the audio signal of the vehicle is adjusted based on a content of the voice.

12. The method according to claim 1, wherein the audio signal of the vehicle is adjusted based on at least one of an age and a gender of the occupant.

13. A device for controlling an audio system of a vehicle, wherein the device is designed to perform the method according to claim 1.

14. A mobile user apparatus for controlling an audio system of a vehicle that includes an interface with the vehicle and that is set up to perform at least part of the method according to claim 1.

15. A non-transitory computer-readable medium storing a program, which when executed on a computer, causes the computer to execute the method according to claim 1.

* * * * *